United States Patent [19]
Benskin et al.

[11] Patent Number: 5,322,623
[45] Date of Patent: * Jun. 21, 1994

[54] LOCAL RECLAMATION SYSTEM

[76] Inventors: Charles O. Benskin, 14528 Pleasant Valley Rd., South Beloit, Ill. 61080; Harley A. Weisse, S23 W23 181 E. Broadway, Waukesha, Wis. 53186

[ * ] Notice: The portion of the term of this patent subsequent to Nov. 16, 2010 has been disclaimed.

[21] Appl. No.: 74,934

[22] Filed: Jun. 10, 1993

Related U.S. Application Data

[63] Continuation of Ser. No. 880,115, May 7, 1992, Pat. No. 5,262,047.

[51] Int. Cl.[5] .................... B01D 36/02; B01D 29/56
[52] U.S. Cl. .................... 210/195.1; 210/196; 210/203; 210/257.1; 210/259; 210/295; 210/297; 210/323.1; 210/748
[58] Field of Search .................... 210/199, 198.1, 203, 210/748, 295, 297, 252, 259, 257.1, 402, 323.1, 195.1, 196, 406

[56] References Cited

U.S. PATENT DOCUMENTS

| | | | |
|---|---|---|---|
| 1,907,691 | 5/1933 | Wait . | |
| 2,660,559 | 11/1953 | Prime | 210/760 |
| 3,001,294 | 9/1961 | Otner | 210/202 |
| 3,448,045 | 6/1969 | Hess et al. | 210/760 |
| 3,539,507 | 11/1979 | Woodbridge et al. | 210/203 |
| 3,660,277 | 5/1972 | McWhirter et al. | 210/760 |
| 3,730,881 | 5/1973 | Armstrong | 210/615 |
| 3,732,163 | 5/1973 | Lapidot | 210/760 |
| 3,758,405 | 9/1973 | Femont | 210/202 |
| 3,805,481 | 4/1974 | Armstrong | 210/96.2 |
| 3,835,039 | 9/1974 | Clambrone | 210/615 |
| 4,136,027 | 1/1979 | Sakamoto et al. | 210/760 |
| 4,595,498 | 6/1986 | Cohen et al. | 210/202 |
| 4,615,800 | 10/1986 | Stifelman et al. | 210/340 |
| 4,622,161 | 11/1986 | Hiltebrand et al. | 210/739 |
| 4,640,782 | 2/1987 | Burleson | 210/748 |
| 4,645,606 | 2/1987 | Ashbrook et al. | 210/695 |
| 4,652,382 | 3/1987 | Edwards et al. | 210/752 |
| 4,659,464 | 4/1987 | Long, Jr. | 210/221.1 |
| 4,728,441 | 3/1988 | King | 210/748 |
| 4,767,525 | 8/1988 | Campbell et al. | 210/87 |
| 4,798,669 | 1/1989 | Bachhofer et al. | 210/109 |
| 4,923,068 | 5/1990 | Crowson | 210/340 |
| 4,923,599 | 5/1990 | Bowers | 210/340 |
| 5,043,079 | 8/1991 | Hallett | 210/748 |
| 5,061,377 | 10/1991 | Lee et al. | 210/758 |
| 5,073,268 | 12/1991 | Saito et al. | 210/748 |
| 5,178,755 | 1/1993 | LaCrosse | 210/748 |

*Primary Examiner*—Neil McCarthy
*Attorney, Agent, or Firm*—Myers & Associates, Ltd.

[57] ABSTRACT

The local reclamation system includes an accumulation tank for a soiled solution. A tank outlet valve selectively allows a flow of the solid soiled solution into the remainder of the system. A blend conduit leads from the outlet valve. An oxidizing supply selectively provides an oxidizing agent to said soiled solution downstream of the outlet valve in the blend conduit. A blend pump receives the soiled solution with oxidizing agent to promote the flow of the soiled solution through the system and a more uniformed disposal of the oxidizing agent throughout the solution. A six stage filter section selectively removes particulate matter. A biologic stage promotes a sterile reclaimed solution and a solution accumulator accumulates and stores the solution. Repeated injections of oxidizing agents occur before filter stage sections and pumps. The reclaimed solution can be reused or discharged without penalty.

7 Claims, 5 Drawing Sheets

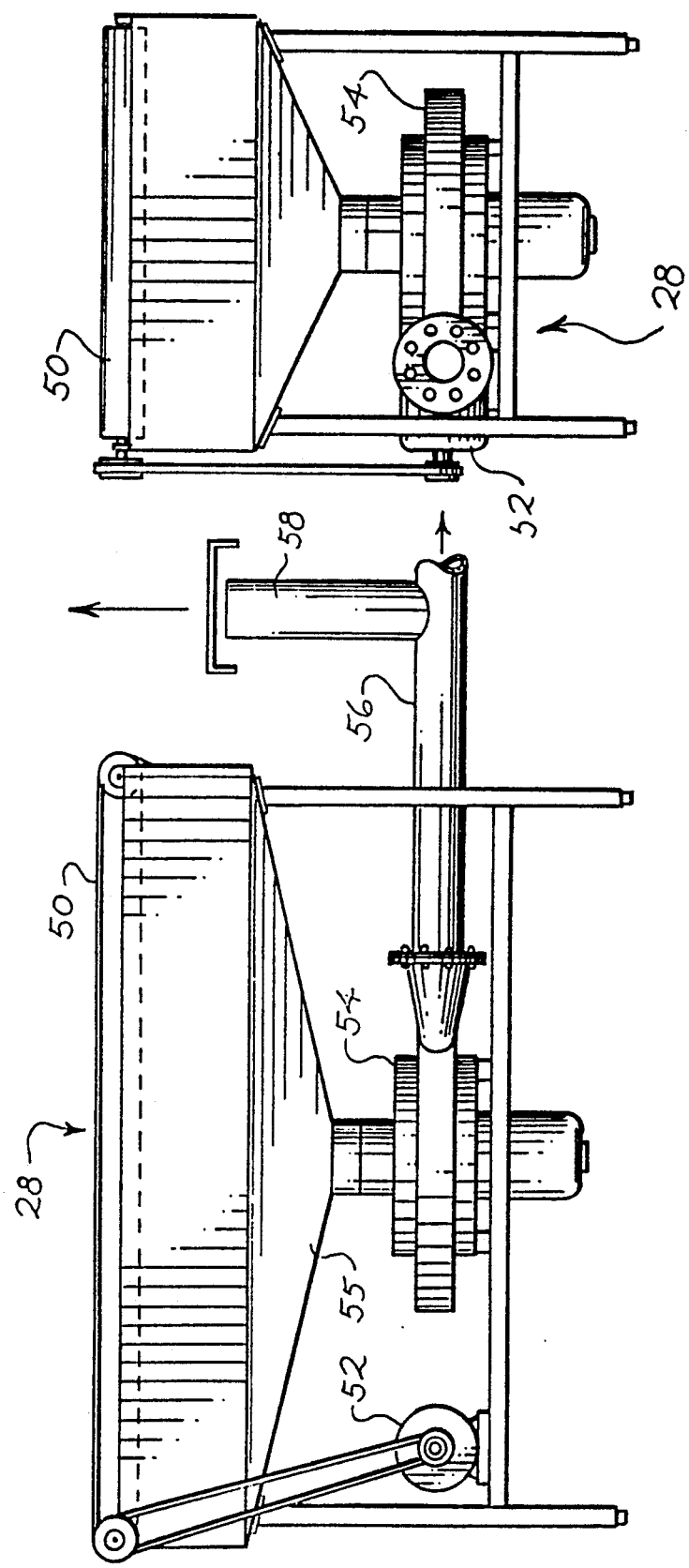

LOCAL RECLAMATION SYSTEM

This is a continuation of co-pending application Ser. No. 880,115 filed May 7, 1992, now U.S. Pat. No. 5,262,047.

BACKGROUND OF THE INVENTION

This invention relates to the treatment of waste water and in particular relates to the treatment of waste water arising from cleaning food processing plants and dairies.

In recent years, municipal sewer plants have increased hook-up and volume charges to the producers of waste which require increased processing. These charges are generally based on the burden imposed on the sewer system by the contaminants produced. The municipal sewer plants must meet various environmental standards and under some circumstances may limit or deny sewer hook-ups which can effectively put the waste producers out of business or at least reduce their profitability to a comparatively minuscule level. A measure of the degree of contamination is the Basic Oxygen Demand (BOD) or initialized Chemical Oxygen Demand (COD). There are two general system methods of treatment, an aerobic system and an anaerobic system.

In an anaerobic system the waste stream after rough filtration is introduced into a closed vessel where anaerobic organisms are introduced to degrade the biological mass. Typically, there is little sludge produced and following the reduction of the biomass by anaerobic digestion the stream is passed to an aerating stage where it is aerated for about 30 days. Normally, that is sufficient for discharge into a stream or used for irrigation. Anaerobic systems are often used in the warmer climates of the United States because the system has to be maintained at a temperature of 80 degrees. The little biomass sludge produced can sometimes be used to heat the system.

In contrast, in an aerobic system, oxygen is added and the ponds are aerated continuously. They are often used in the North because temperature is not as critical in the treatment process as it is in an anaerobic system. At the end of aeration a bigger sludge mass is produced.

A need exists for a local system to drop the basic oxygen demand and the chemical oxygen demand particularly if the liquid portions can be reused rather than entering the sewer system directly or if the filtered solids can be retrieved and used as a component of animal feed. The local, or on site, system treats contaminates at the site where they originate and would be very useful where a cleaning in place (CIP) mechanism exists in the food industry. A CIP mechanism produces a large volume of solution contaminated with meat, poultry and dairy particles and mixed with cleaning agents. The contaminated solution is not mixed with body wastes until and unless the contaminated solution enters a municipal sanitary waste system.

The present invention is designed to reclaim waste water for reuse and recovery of solid particulates to avoid the sewer system for at least a cycle or two. In many circumstances, the inventative reclamation system will filter cleaning solutions and allow the reuse of the water for cleaning, conserve heat, and chemicals and anything else that can be recycled and take the solids out so that all is saved. Following treatment the solution can be reused for cleaning. The filtered solution is of sufficient cleanliness that sewage hook-up charges or use charges are greatly reduced or may even reach the degree of cleanliness to allow discharge into streams or wetlands.

Portions and elements of the present system in various aspects are known.

*Milking Money from Wastewater*, Dairy Foods, October 1990, discusses a European batch process characterized as a coagulation/flotation system. Air pressurized water is used to float flocculated particles precipitated from an acid solution.

A general discussion of filtration is printed in Van Nostrands Scientific Encyclopedia, 5th Edition at pages 1037 through 1040. Some of the filter types illustrated are similar to those used in the present invention.

U.S. Pat. No. 4,798,669 issued to Bruno Bachhofer et al on Jan. 17, 1989 (filed Jan. 11, 1988) describing a SYSTEM FOR TREATING WATER WITH OZONE. This basic process is similar to the invention of this application. Ozone is added to untreated water with filters downstream for disinfection. The preferred application is drinking water treatment. The filters have reducing action to remove excess ozone.

U.S. Pat. No. 5,043,079 issued to Ronald Hallett on Aug. 27, 1991 (filed Jan. 24, 1991) describing a WASTEWATER TREATMENT PROCESS WITH AN OZONE CONTACTOR. This patent covers a new contactor to apply ozone to waste water. It covers methods of blending ozone with water. This process also uses ultra-violet light to improve the process.

U.S. Pat. No. 3,835,039 issued to David Clambrone on Sep. 10, 1974 (filed Dec. 22, 1972) describing a WASTE WATER TREATMENT SYSTEM. This patent is quite similar to the process of the present application but the process is for sewage treatment and allows for recycling of water. It uses ultra-violet lamps to produce ozone with air. The treated effluent is filtered to remove large particles.

*Milking Money from Wastewater*, Dairy Foods, October 1990, discusses a European batch process characterized as a coagulation/flotation system. Air pressurized water is used to float flocculated particles precipitated from an acid solution.

SUMMARY OF THE INVENTION

The local reclamation system of the present invention includes an accumulation tank for a soiled solution. A tank outlet valve selectively allowing a flow of the solid soiled solution into the remainder of the system. A blend conduit leads from the outlet valve. An oxidizing supply selectively provides an oxidizing agent to said soiled solution downstream of the outlet valve in the blend conduit. A blend pump receives the soiled solution with oxidizing agent to promote the flow of the soiled solution through the system and a more uniformed disposal of the oxidizing agent throughout the solution. A filter section selectively removes particulate matter. A biologic stage promotes a sterile reclaimed solution and a reclaimed solution accumulator accumulates and stores the reclaminated solution. Repeated injections of oxidizing agents occur before filter sections and pumps.

BRIEF DESCRIPTION OF THE DRAWING

FIGS. 2 and 3 is a front elevation and side elevation of a vacuum filter used in the invention.

DETAILED DESCRIPTION OF THE DRAWING

Figure 1A:
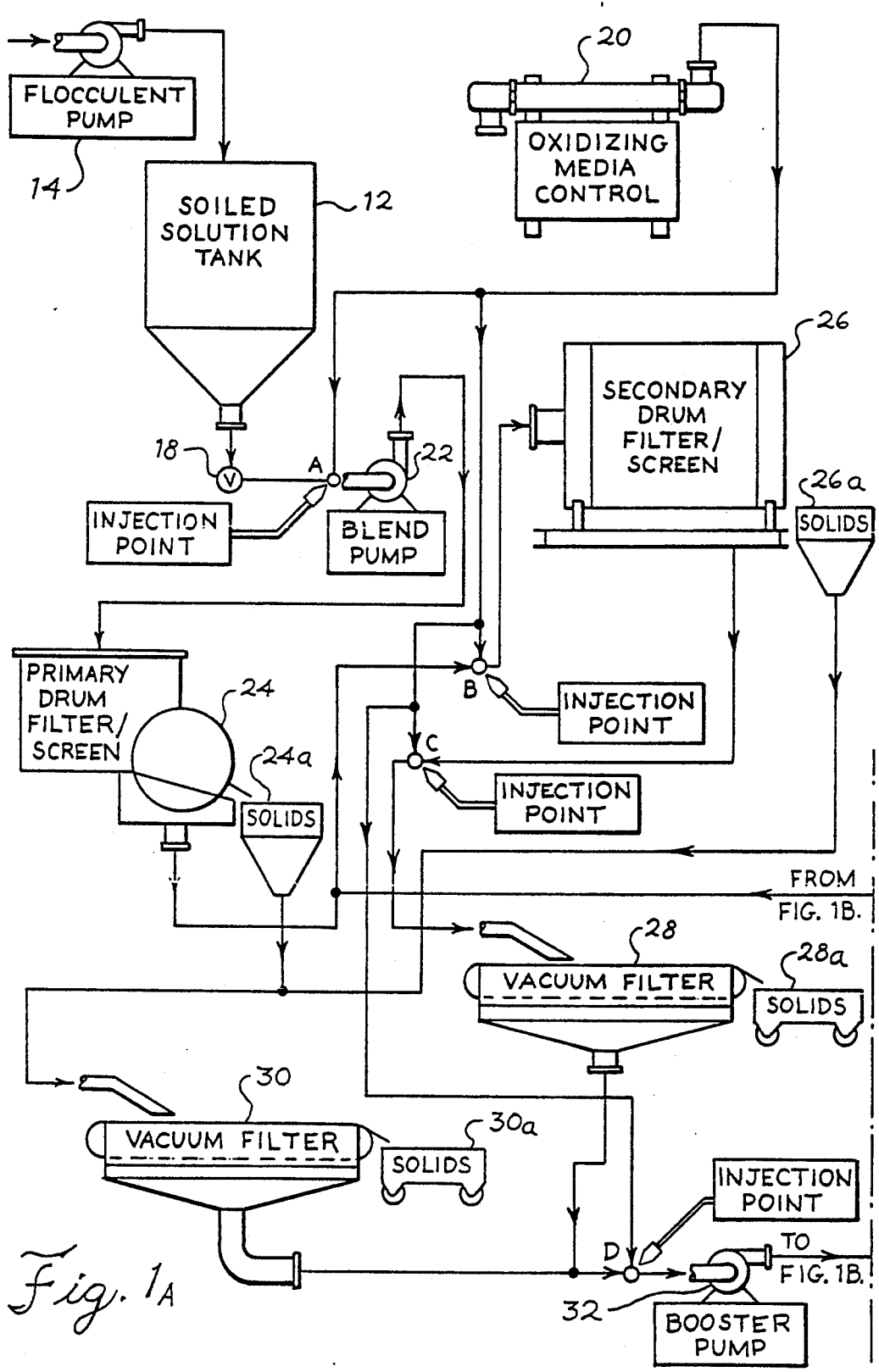
FIGS. 1A and 1B illustrates the mechanical aspects of the local reclamation system of the present invention.
Figure 1B:
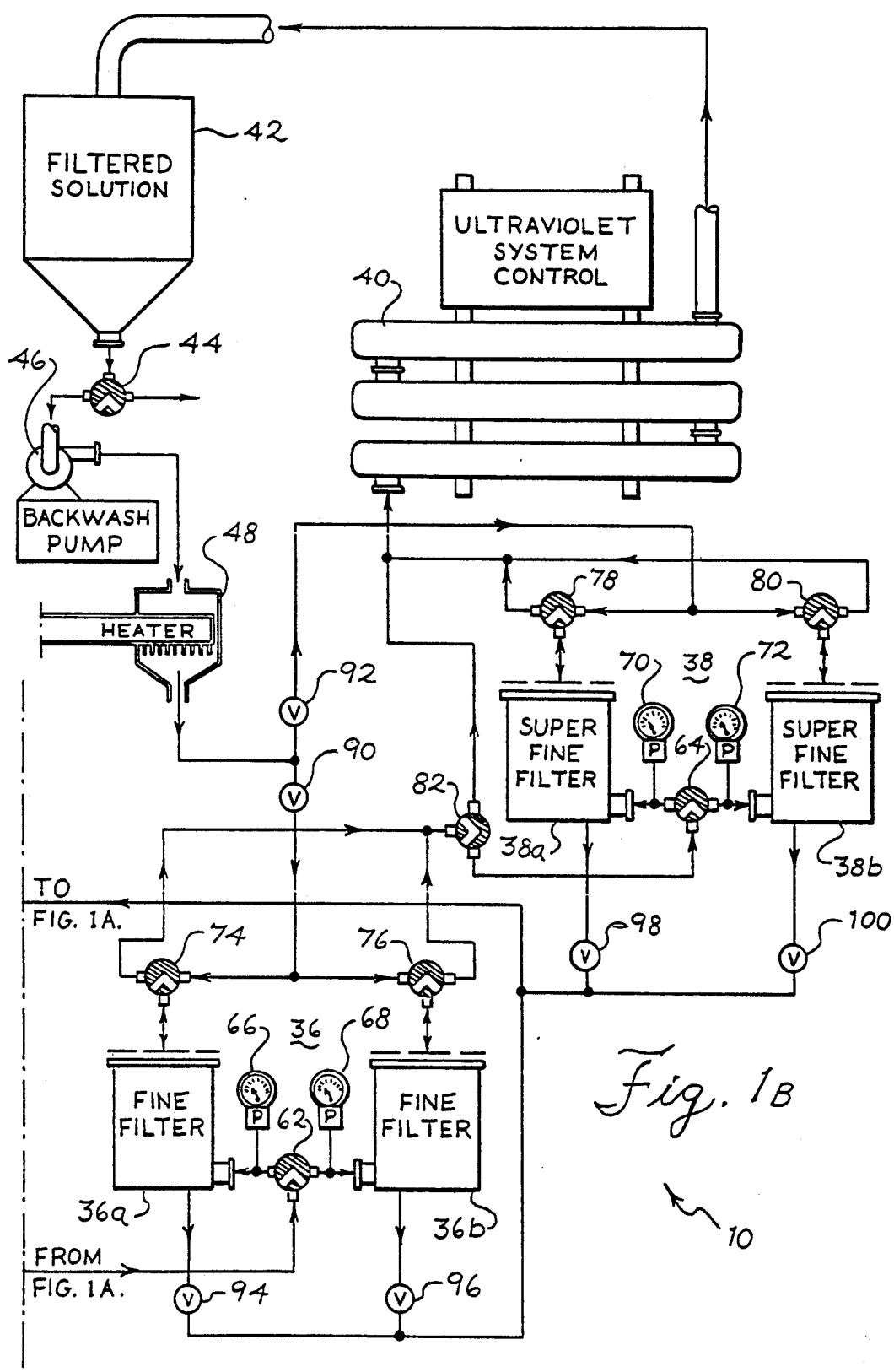

The reclamation system 10 of the present invention is distributed between FIGS. 1a and 1b of the drawing in its mechanical portion. An accumulation tank 12 accumulates the soiled solution and receives a flocculating agent pumped to the tank by flocculent pump 14. The soiled solution received in accumulation tank 12 may be most often generated in the process of cleaning a food processor plant to include dairy processors. A liquid level controller 16 (FIG. 4) is used to control the opening and shutting of valve 18. The opening of system valve 18 initiates a continuous process which is until the liquid level control 16 causes valve 18 to close. The preferred liquid level control is Model FLT manufactured by Lumenite Electronic Company at 2331 N. 17th, Franklin Park, Ill.. When soiled solution accumulates in the accumulation tank 12 and rises to an upper liquid level probe the system valve 18 is opened. When the soiled solution of the tank falls below the lower liquid level probe system valve 18 is closed. An oxidizing media control source 20 injects the oxidizing agent into the flowing soiled solution at injection point A. Oxidizing source is preferably an ultra-violet lamp generating ozone in ozone lamp tube 21. The injected soil solution is then pumped and mixed in blend pump 22 which both disperses the oxidizing agent and pumps the oxidized soiled solution to a primary drum filter 24. The oxidizing agents include oxygen, ozone, hydrogen peroxide, and other agents which do not leave a strong toxic residue. Very often ambient air is sufficient to oxidize the soiled solution and satisfy the basic oxygen demand and chemical oxygen demand. Primary drum filter 24 includes solid accumulator 24a. A first cake from filtered particles is scraped off the filter screen into solid accumulator 24a. A first filtrate and a first cake result from the filtering in primary filter 24. The first filtrate from first filter 24 exits primary filter 24 and passes through a second injection point B where a second injection of the oxidizing media is made, resulting in a second injected solution. The second injected solution then proceeds to a secondary drum filter 26 where the second injected solution is filtered to produce a second filter solution, or filtrate, and a second filter cake accumulated in second cake accumulator 26a. The second filtered solution then proceeds to the third injection point C resulting in a third injected solution. The third injected solution together with a portion is conveyed to a vacuum filter 28 to produce a first vacuum cake and a first vacuum solution. The first vacuum solution is then conveyed to the fourth injection point D where it receives additional oxidizing media. The solids or cake from the earlier filtrations accumulated in accumulators 26a and 24a are conveyed to a second vacuum filter 30 where they are filtered into a second vacuum filter solution and a second vacuum cake from the solid particles removed from the earlier receptacles. The second vacuum filter solution is also conveyed to the fourth injection point D. Each vacuum filter 26, 28 "dewaters'- 'its respective cake thoroughly and gently avoiding cake fragmentation. The cake accumulated in cake receptacles 28a and 30a may often be used with little further processing to feed various animals. Of course, it can always be discarded. The fourth injected fluid is conveyed to a booster pump 32 downstream of the fourth injection point D further mixing the oxidizing agents and filtrate. The various pumps and filters in this system tend to mix the oxidizing agent in the filtrate. Booster pump 32 pressurizes the fourth injected fluid sufficiently to allow it to pass through successive finer filter stages. Generally, it is preferrable that the Primary filter 24 and the Secondary filter 26 have the same size orifice in the range of $2 \times 10^{-3}$ to $10^{-5}$ m. Obviously, the secondary filter should be smaller if the orifice size differs. The vacuum filters 28,30 should range between about 400 mesh and 4 mesh and generally be the same size.

Fine 36 and super fine 38 filter stages orifice should range between $0.2 \times 10^{-6}$ m and $400 \times 10^{-6}$ m with the super fine stage 38 always smaller than the fine stage 36.

Successive discrete components of reclamation system 10 are found on FIG. 1b of the drawing. A vacuum filter liquid level controller 34 (FIG. 4A) with one activating probe in the conduit downstream of injection point D acts as a flow switch to make sure that there is liquid for booster pump 32 to pump. The oxidizing media is mixed in the vacuum filtrates and conveyed to a fine filter stage 36 where the injected solution is filtered to produce a fine filtered solution. Fine filter stage 36 includes a first fine filter 36a and a second fine filter 36b, as will later be explained. Typically either the first 36a or second 36b fine filter will be active at a given moment to produce a fine filtrate. The fine filtrate is conveyed to a super fine filter stage 38 or to a biological means for reducing live bacteria in a soiled solution preferably in an ultraviolet light. On exiting the super fine filter stage 38 the super fine filtered solution proceeds to the biological means 40 where it is rendered sterile. The preferred biological means 40 is an ultraviolet irradiation lamp. The biologically inert solution produced in the ultraviolet system 40 is then conveyed to a filtered solution accumulator 42 where it is selectively held for further utilization. At the outlet of accumulator tank 42 is a reuse valve 44 which selectively allows diversion of the final filtered solution to the start of the process which generated the soiled solution, or towards backwashing those components of the system which need backwashing such as the fine and super fine filters 36 and 38. Of course, the final filtered solution may be disposed of without environmental harm after passing through the reclamation system. If the final solution is to be used in backwashing it passes to a backwash pump 46 where it is pressurized to pass through the fine and super fine filters 36, 38 selectively. Prior to being conducted to either fine filter the pressurized final solution passes through a heater 48 so that its temperature is sufficient to return some of the filtered particles in the fine or super fine filters to solution including the fat particles. The backwashed solution is then conveyed to an earlier stage of the reclamation system such as a point between the primary or first filter 24 and the second filter 26 where it passes through successive filter stages again.

Vacuum filters 28 and 30 are believed to be of novel design. Excepting the mesh or slot size, the filters 28, 30 can be identical. Using vacuum filter 28 as an exemplar of each in FIG. 2 and FIG. 3, the design of the vacuum filters include a flexible slotted vacuum screen 50 or mesh upon which cake accumulates. The cake accumulating from the filter 28 falls or is scraped off vacuum mesh 50 into solid accumulator 28a. The mesh is a continuous belt which is motorized and driven by vacuum motor 52. A vacuum centripetal pump 54 applies vacuum from the bottom of vacuum tank 55 to extract filtrate. The extracted filtrate is conveyed to fourth injection point D through conduit 56 which is vented by stand pipe 58.

Figure 4A:
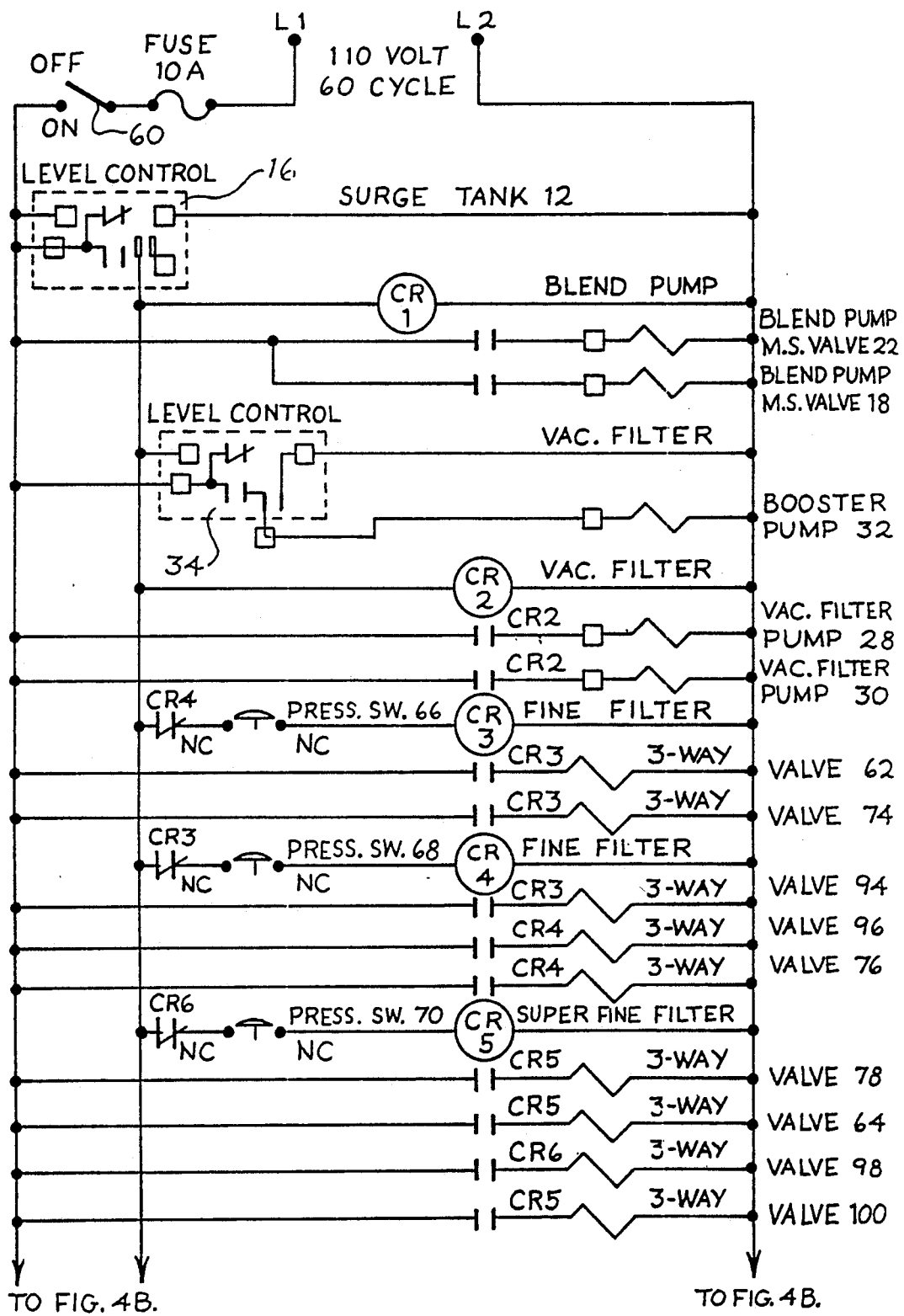
FIGS. 4A and 4B is a ladder diagram showing an arrangement of the control system of the present invention.
Figure 4B:
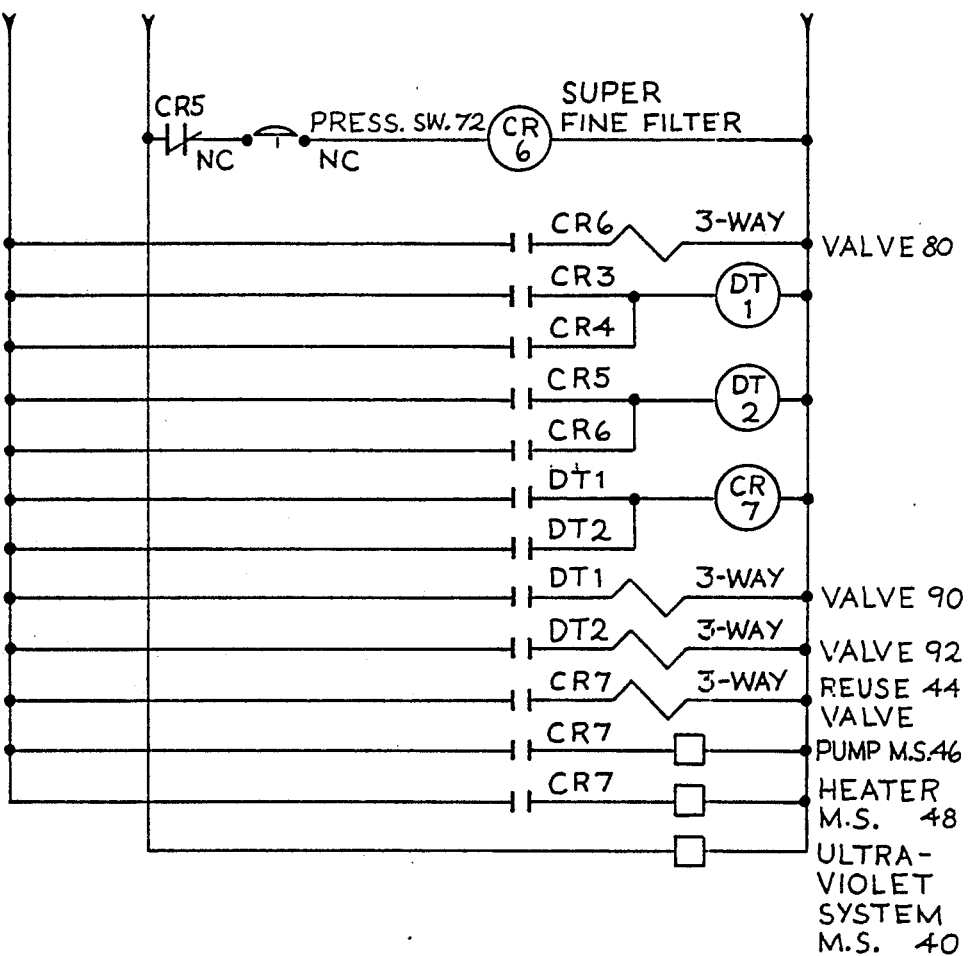

FIGS. 4a and 4b is a ladder diagram for the electrical controls of the mechanical components. A system on/off switch 60 enables the control system to function. The overall design is such that only one of the parallel fine pots in first fine filter stage 36 or first super fine filter stage 38 is filtering in a forward direction while the other fine filter pot is being backwashed. Duration timers insure that backwashing occurs only for a limited time. Backwashing the fine filters 36a or 36b is initiated by pressure switches in the conduit leading to the individual fine filter pot. First and second fine filters 36a, 36b cannot be backwashed at the same time due to interlocking contacts or programmable logic controllers. Additionally, each backwash conduit is isolated from its neighbors by shut off isolation valves allowing flow in appropriate direction and time in the backwash conduit associated with each filter. An examination of FIGS. 4A and 4B with FIG. 1B will assist in understanding the functioning of the system. Excepting the sizes of the filters themselves there is no substantial difference between the fine 36 and super fine 38 filter stages. A fine directional valve 62 or super fine directional valve 64 is the entry to each stage for directing flow to, first or second fine filters 36a or 36b or to first or second super fine filters 38a or 38b. Each branch from the directional valve to the fine or super fine filter is monitored by normally closed pressure switches. A first fine pressure switch 66 monitors the effectiveness of the first fine filter. A second fine pressure switch 68 monitors the effectiveness of the second fine filter. Similarly, a first super pressure switch 70 monitors the effectiveness of the first super filter and a second super pressure switch 72 monitors the effectiveness of the second super fine filter 38b. Similarly, to complement the fine input directional valve 62 there is a fine out first directional valve 74 on the output of the first fine filter 36a. A second fine out directional valve 76 is at the output of second fine filter 36b. Analogous first and second super fine out directional valves 78 and 80 are at the outputs of their respective filters and super fine filter stage 38. The out directional valves 74, 76, 78 and 80 selectively allow forward (i.e., towards the biological means 40) or reverse backwash flow from the filter solution accumulator 42. A super bypass valve 82 selectively allows bypassing super fine filter stage 38 and proceeding directly to biological means 40 from super fine filter stage 36. Reuse valve 44 selectively directs flow to backwash pump 46 or to other uses of the filtered solution. The other uses for the solution include recycling it for washing or other activities, or merely discharging it to a sewer system or environment without penalty or liability. Two backwash valves are in the backwash conduit. Fine backwash valve 90 allows flow to the fine filter stage 36. Super fine backwash valve 92 allows flow to super fine filter stage 38. Each is located downstream of heater 48 in an individual branch leading to the associated filter stages.

It is not desirable to mix filtrate with backwash solutions. To isolate each fine and super fine filter, a shut off valve is inserted in the backwash conduit leading from each filter. A first fine isolation valve 94 isolates the first fine filter 36a. A second fine isolation valve 96 isolates second fine filter 36b. When first fine filter 36a is in normal forward flow first fine isolation valve 94 is shut to prevent flow between first fine filter 36a and second fine filter 36b. Conversely, when second fine filter 36b is being backwashed, second fine isolation valve 96 is open to allow the backwash solution to recirculate. First, 98, and second, 100, super fine isolation valves provide analogous isolation for super fine filter stage 38. Interlocking contacts insure that only one valve in a filter stage is being backwashed at a time and the valve not being backwashed is in a forward filtering flow condition.

The logical scheme controlling the operation of the system is relatively straightforward. However, to assist in the more complex areas of interlocking within a filter stage the fine filter stage 36 will be further described.

A casual examination of FIG. 4A of the ladder diagram will reveal that when the system on/off switch is switched to the on position and the liquid in the surge tank is above the lower level electrode relay coil 3 will become energized through normally closed contact from relay coil 4 and normally closed contact of pressure switch 66. When this energization occurs fine input directional valve 62 is oriented to direct the solution into fine filter 36a. Additionally, a second normally open contact closes to direct first fine out directional valve 74 to allow forward flow towards biological sterilizer 40 and to block backwash flow from heater 48. At the same time, as shown in FIG. 4B, a normally open contact operated by relay coil 3 is closed to energized duration timer 1. Duration timer 1 being energized, a normally open contact energizes relay coil 7 to begin the backwash process for the duration. That duration timer 1 coil is energized and positions reuse valve 44 to backwash the fine filter stage. A second normally closed contact of relay coil 3 associated with pressure switch 68 prevents relay coil 4 from being energized so that the second fine out direction valve 76 is oriented to direct solution from heater 48 in reverse flow through fine filter 36b. An open contact operated by relay coil 4 orients the second fine isolation valve 96 to allow the backwash solution to flow ultimately into the near beginning of the system prior to injection point B. Relay coil 3 being energized closes another set of open contacts to close first fine isolation valve 94 and prevent back flow through fine filter 36a.

As the first fine filter 36a removes particles from the soiled solution the back pressure increases in first pressure switch 66. when pressure switch 66 senses a predetermined clogging pressure, relay coil 3 is de-energized by the opening of pressure switch 66 interlocked with relay coil 3. A normally closed contact associated with relay coil 4 allows relay coil 4 to be energized. This in turn reverses the analogous states of energization associated with second fine filter 36b ending the backwash of filter 36b, if it is still being backwashed, and beginning a new backwash cycle for first fine filter 36a. Forward flow is maintained through second fine filter 36b until the back pressure builds to a predetermined point and opens pressure switch 68. The analogous components in super fine filter stage 38 operate in a similar manner. If soiled solution is being added at a continuous rate and accepted by system 10 it may be necessary to introduce a delay stage to allow complete flocculation between system valve 18 and first injection point A. In many cases a long conduit may be used between those points. Alternately a delay tank can be introduced.

The steps of the process are illustrated in the system of the invention.

As those skilled in the art will readily recognize, some of the invention elements may be interchanged, for example those shown as integral may be separated or those separated may be made integral without adversely affecting the performance of the invention. Some process steps may be skipped, rather than reiterated, or interchanged.

From the foregoing description it will be apparent that modifications can be made to the system and process of the present invention without departing from the teaching of the invention. Also, it will be appreciated that the invention has a number of advantages, some of which have been described above and others of which are inherent in the invention. Accordingly, the scope of the invention is only to be limited as is necessitated by the accompanying claims.

We claim:

1. A liquid treatment system comprising:
   an accumulation tank for receiving a soiled solution;
   a tank outlet valve for selectively allowing flow of said soiled solution from said accumulation tank to points downstream of said accumulation tank;
   a blend conduit leading from said outlet valve;
   first means supplying a first oxidizing agent to said soiled solution downstream of said outlet valve and upstream of a first filter stage comprising a first filter means;
   blend means receiving said soiled solution with said first oxidizing agent, said blend means promoting flow of said soiled solution through the system and for promoting uniform dispersal of said first oxidizing agent through the solution;
   at least one additional filter stage downstream of said first filter stage and comprising at least one filter means of a different type than said first filter means and having a finer filter media than said first filter means;
   second means supplying at least one additional oxidizing agent to said soiled solution upstream of said at least one additional filter means and downstream of said first filter means,
   ultraviolet light treatment means downstream of said at least one additional filter stage for producing a treated solution; and
   a treated solution accumulator downstream of said ultraviolet light treatment stage.

2. The system of claim 1 wherein said first filter stage comprises a first rotary drum filter and said at least one additional filter stage includes a micron pot filter.

3. The system of claim 1 wherein said at least one additional filter stage includes a first vacuum filter.

4. The system of claim 2 wherein said first filter stage comprises a second rotary drum filter downstream of said first rotary drum filter.

5. The system of claim 3 wherein said at least one additional filter stage further includes a second filter stage comprising a second vacuum filter for receiving solids from said first filter stage and for returning filtered solution to the system.

6. The system of claim 1 further comprising:
   means for introducing a flocculating agent into said soiled solution upstream of said blend means; and
   a conduit downstream of said blend means for promoting uniform dispersal of said flocculating agent and for promoting flocculation.

7. The system of claim 1 wherein said at least one additional filter stage includes second and third filter stages, said second and third filter stages having second and third filter means, said second filter means having a finer filter media than said first filter means, said third filter means having a finer filter media than said second filter means.

* * * * *